United States Patent
Campbell et al.

[11] Patent Number: 5,815,087
[45] Date of Patent: Sep. 29, 1998

[54] ANTI-THEFT SYSEM FOR A REMOVABLE ACCESSORY OF AN AUTOMOTVE VEHICLE

[75] Inventors: Scott O. Campbell, Canton; Paul Simmons, Chesterfield; John F. Kennedy, Dearborn, all of Mich.

[73] Assignee: Ford Motor Company, Dearborn, Mich.

[21] Appl. No.: 626,585

[22] Filed: Apr. 2, 1996

[51] Int. Cl.[6] ............................ B60R 25/00; G06F 7/00
[52] U.S. Cl. .................................. 340/825.54; 307/10.2
[58] Field of Search .................................. 307/10.1, 10.2, 307/10.3, 10.5, 9.1; 340/825.54, 426, 505, 825.69, 825.72, 825.32, 825.34, 825.44, 825.31; 701/29, 33; 180/287; 341/176

[56] References Cited

U.S. PATENT DOCUMENTS

| | | |
|---|---|---|
| 3,696,383 | 10/1972 | Oishi et al. . |
| 4,510,495 | 4/1985 | Sigrimis et al. . |
| 4,730,188 | 3/1988 | Milheiser . |
| 4,973,958 | 11/1990 | Hirano et al. . |
| 4,983,963 | 1/1991 | Hodgetts et al. . |
| 5,014,050 | 5/1991 | Lewiner et al. . |
| 5,043,722 | 8/1991 | Aggers et al. . |
| 5,229,648 | 7/1993 | Sues e al. ............................. 307/10.2 |
| 5,523,948 | 7/1996 | Adrain ................................ 364/431.01 |
| 5,539,377 | 7/1996 | Dillon ..................................... 340/426 |

Primary Examiner—Michael Horabik
Assistant Examiner—Jean B. Jeanglade
Attorney, Agent, or Firm—Roger L. May

[57] ABSTRACT

An anti-theft system for a removable accessory has a transponder with a transponder security code located in the removable accessory. A remote sensing coil is operatively coupled to the transponder. A memory stores a security code corresponding to the transponder. A control module coupled to the remote sensing coil and the memory generates an interrogate signal and receives a response signal through the remote sensing coil. The transponder generating a response signal in the form of a transponder security code in response to the interrogate signal. The control module compares the transponder security code to the stored security code. If the transponder security code is not equal to the stored security code, a predetermined function is disabled. An output means is coupled to the control module for providing an indication to a vehicle operator of the disabled predetermined function.

17 Claims, 2 Drawing Sheets

ANTI-THEFT SYSEM FOR A REMOVABLE ACCESSORY OF AN AUTOMOTVE VEHICLE

RELATED APPLICATIONS

This application is related to commonly assigned U.S. application (Attorney Docket Nos. 95-0794 and 96-0252) concurrently filed herewith and incorporated by reference herein.

FIELD OF THE INVENTION

The present invention relates to an anti-theft system for an automotive vehicle and, more specifically, to an anti-theft system for removable accessories of an automotive vehicle.

BACKGROUND OF THE INVENTION

Even though the theft rate for vehicles is decreasing, theft for some removable vehicle accessories is increasing. Removable accessories include items such as airbags, audio components, wheels, bumpers, and cellular phones. Removable accessories are commonly stolen without stealing the entire vehicle.

One removable accessory of particular interest is the airbag. The increasing proliferation of airbags into the market has increased the marketability of stolen airbags. Current airbags are easily removed from vehicles and are virtually untraceable.

One proposed solution is to provide a special tool that must be used to remove the accessory. One problem with such tools is that unauthorized duplication is hard to control, which defeats the purpose of the tool. Another problem with such an approach is that once the accessory is removed, they may be used as replacements in other vehicles.

It would therefore be desirable to reduce theft of removable accessories in an automotive vehicle by providing an anti-theft system that discourages installing an unauthorized accessory into a vehicle.

SUMMARY OF THE INVENTION

The present invention overcomes the disadvantages of the related art by providing a transponder with a transponder security code located in the removable accessory. A remote sensing coil is operatively coupled to the transponder. A memory stores a stored security code corresponding to the transponder. A control module coupled to the remote sensing coil and the memory generates an interrogate signal and receives a response signal through the remote sensing coil. The transponder generates a response signal in the form of a transponder security code in response to the interrogate signal. The control module compares the transponder security code to the stored security code. If the transponder security code is not equal to the stored security code, a predetermined function is disabled. An output means is coupled to the control module for providing an indication to a vehicle operator of the disabled predetermined function.

One advantage of the present invention is that driver feedback may be used to inform the vehicle operator if an unauthorized replacement part has been used. The feedback may be, for example, an indicator light or reducing the performance of the engine through communication with the vehicle's powertrain control module.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF PREFERRED EMBODIMENT

Figure 1:
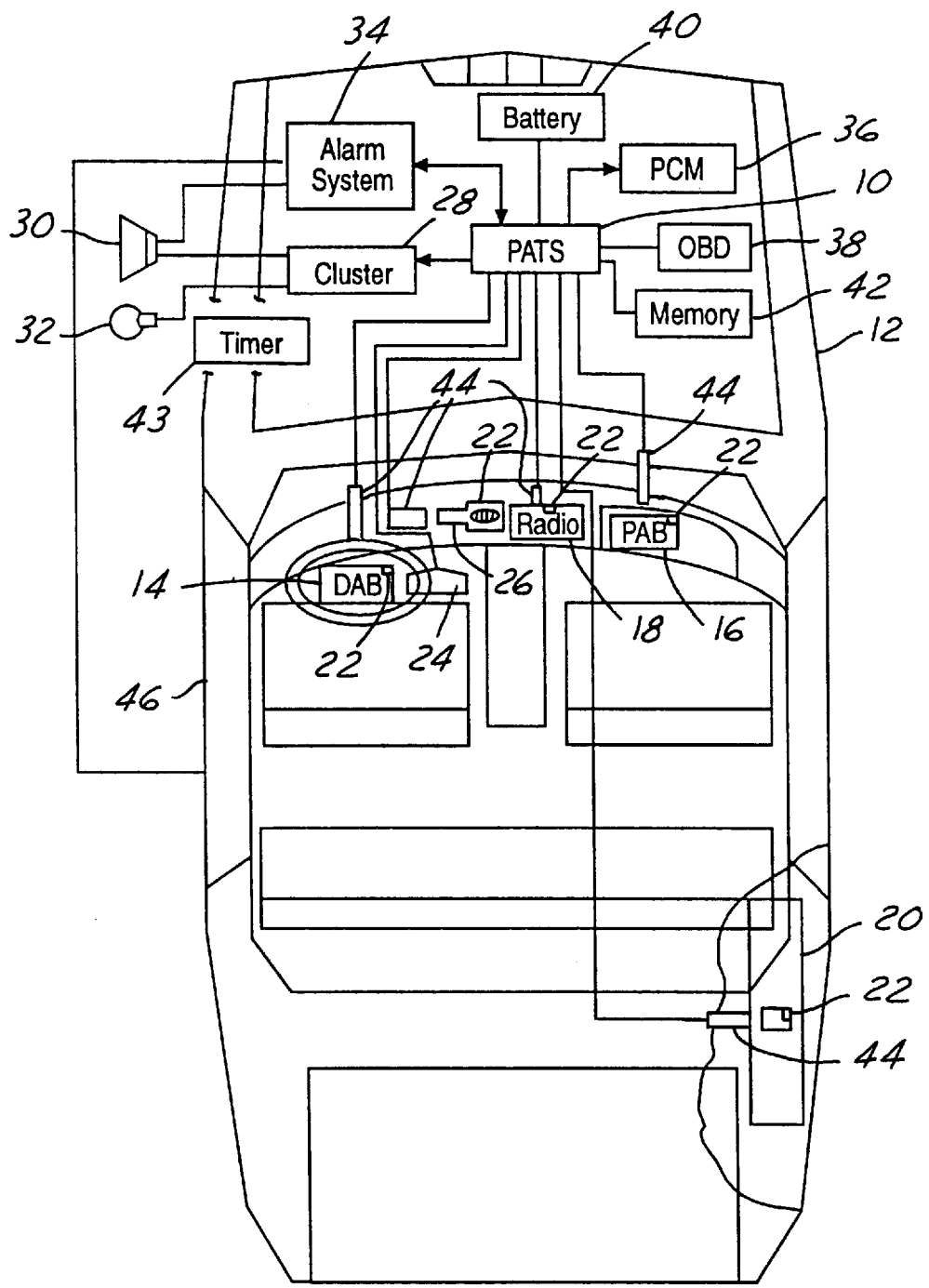
FIG. 1 is a block diagram of a security system for removable accessories according to the present invention.

Referring now to FIG. 1, a passive anti-theft system (PATS) controller 10 is a microprocessor-based control module used to control various inputs and outputs of an accessory security system. PATS controller 10 is located within an automotive vehicle 12. Vehicle 12 has numerous removable accessories such as a driver airbag 14, a passenger airbag 16, a radio 18 and a wheel 20. Each airbag has a triggering and control circuits represented by airbags 14 and 16. Each removable accessory preferably has a transponder 22 for storing information about the particular removable accessory such as a security code. Each transponder 22 may have an address so that if several transponders 22 are located within vehicle 12, controller 10 can identify each transponder.

PATS controller 10 may also be connected to an ignition module 24 to trigger PATS controller 10 to interrogate transponders 22 in the removable accessories. Ignition module 24 senses the insertion of a key 26. Key 26 may also have a transponder 22 similar to that of the removable accessories. When PATS controller 10 either reads a proper security code from key 26 or senses the insertion of key 26 through ignition module 24, a control signal is sent to PATS controller 10 to read the security codes from the removable accessories.

PATS controller 10 may also be used to interface with other components in the automotive vehicle. For example, PATS controller 10 may be used to control an output device such as an instrument cluster 28, which may include a speaker 30 and an indicator light 32. PATS controller 10 may also interface with a perimeter alarm system 34, a powertrain control module 36 and an onboard diagnostic interface 38. PATS controller may also receive a deployed signal if an airbag has been deployed. If an airbag has been deployed the status of the transponder code of the deployed airbag may be changed to an invalid code in the memory of PATS controller.

Alarm system 34 is a perimeter alarm system used for monitoring the status of the doors 46 of automotive vehicle 12. As is common, alarm system 34 may sound an alarm through a speaker 30 when the alarm system is set and an unauthorized opening of passenger door 46 occurs. PATS controller 10 is inactive when the vehicle is not running or the key is not in the accessory position of the ignition lock. Alarm system 34 may be used to trigger PATS controller 10 periodically to monitor the status of each remote accessory. Alarm system 34 may activate if a remote accessory is interrogated by PATS controller 10 that was previously present and no response is generated from the transponder associated with the remote accessory.

Powertrain control module 36 is used to control the operation of the vehicle's powertrain, i.e., the transmission and engine. One method of providing the vehicle operator an indication that an unauthorized removable accessory has been replaced into the vehicle is degrading the engine performance through powertrain control module 36. If the engine performance has been degraded through powertrain control module 36 and the vehicle is then taken to a dealer for diagnostics, onboard diagnostic interface 38 is used to provide a fault code to a fault code reader such as a service bay computer not shown. The fault code signals the service technician that an unauthorized removable accessory has been placed within the vehicle.

PATS controller 10 is powered by a vehicle battery 40. PATS controller 10 also has associated with it a memory 42 for storing a stored security code. Preferably, memory 42 is a non-volatile memory used to store security codes for each of the removable accessories. Memory 42 is shown as a separate component, however, PATS controller 10 may have an internal memory integral with it.

A timer 43 is used to control the timing of PATS controller 10. For example, if transponders do not respond within a predetermined time, PATS controller 10 determines that no transponder is present. Timer 43 may also be used to store in memory the time a removable device was installed into a vehicle. For example, the time an airbag was installed in a vehicle could be read by an insurance adjuster through onboard diagnostic interface 38. This prevents service fraud where a non-deployed airbag is replaced with a deployed airbag to inflate the insurance quote.

As illustrated, each removable accessory and ignition module 24 have a remote coil assembly 44 associated with it. One configuration of a remote coil assembly 44 is found in the concurrently filed application. Remote coil assembly 44 is preferably adjacent the transponder of its associated removable accessory when the removable accessory is in its unremoved position. Each remote coil assembly 44 is multiplexed into PATS controller 10 so that PATS controller 10 controls the interrogation of each remote coil assembly 44. To read the security code stored in a removable accessory, PATS controller 10 generates an interrogation signal that is sent to remote coil assembly 44 to charge transponder 22 in the removable accessory. Interrogation signal consists of an RF signal having a predetermined frequency for a predetermined duration. Transponder 22 responds by transmitting back its security code and any other associated information through remote coil assembly 44 to PATS controller 10. PATS controller 10 then reads memory 42 and compares the received code to the code in memory 42. If the security code from the transponder does not correspond with the security code stored in memory 42, PATS controller 10 may respond in a number of ways. For example, PATS controller 10 may alert the vehicle operator through an audible noise through speaker 30 or through an indicator light 32 that the associated removable accessory is not a proper accessory. PATS controller 10 may use one coil assembly to communicate with individually addressed transponders. PATS controller 10 sends an address with an interrogation signal.

Figure 2:
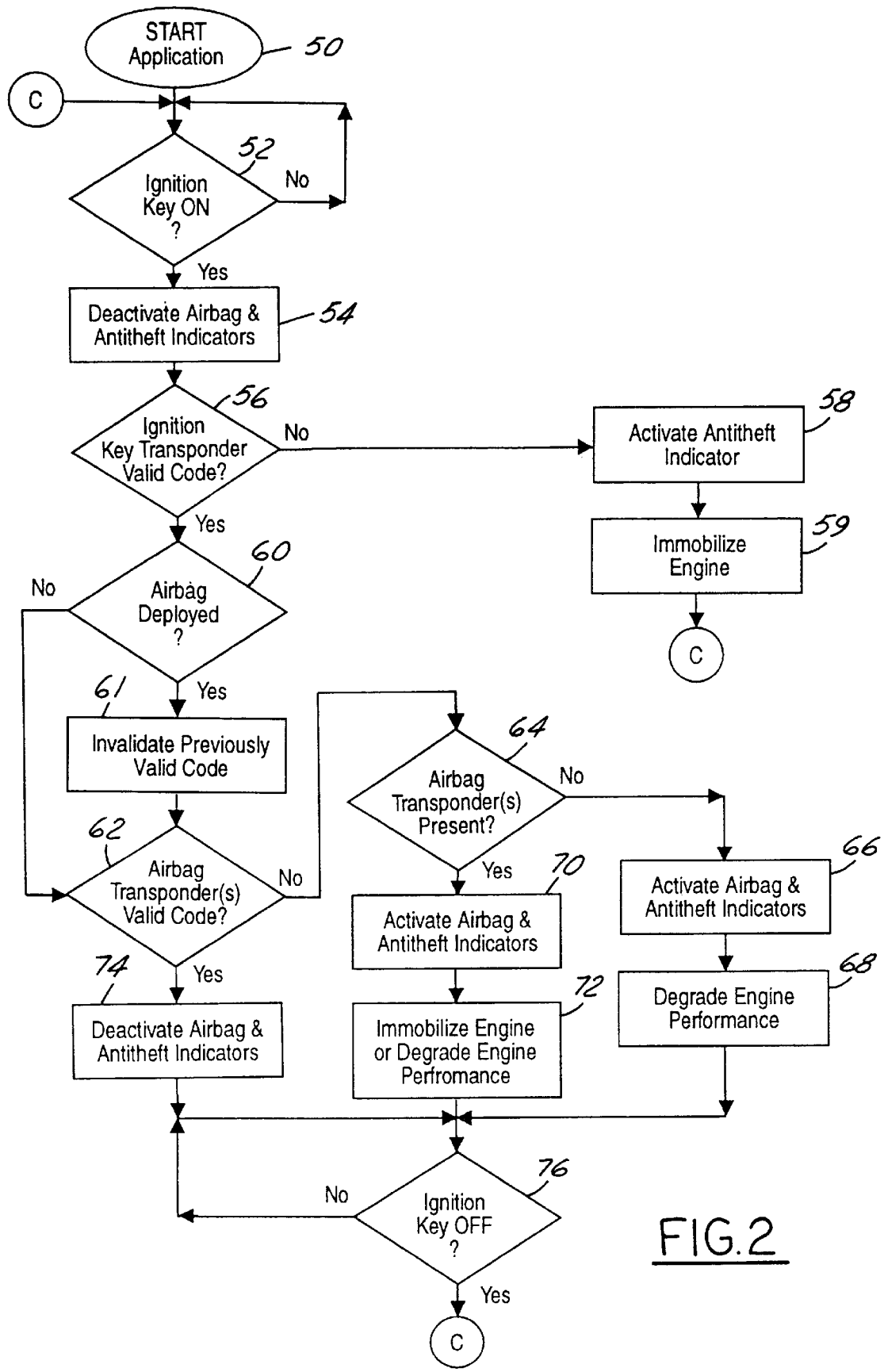
FIG. 2 are flow charts of the operation of the removable accessory security system such as an airbag.

Referring now to FIG. 2, the operation of a removable accessory anti-theft system is described with respect to an airbag. The application is started in step 50. In step 52 the trigger means is checked. Step 52 uses the position of the ignition key to trigger continuing the sequence. If the ignition key is not in the on position, step 52 is repeated. If the ignition key is in the on position, which is sensed by the ignition module, step 54 is executed. Step 54 deactivates the airbag and anti-theft indicator on the instrument cluster. Preferably, the indicators are illuminated when the ignition key is first turned to indicate the performance of the system diagnostics. Once the diagnostics are complete the lights deactivate.

The ignition key preferably has a transponder. In step 59 ignition key is checked to see whether the code stored in the transponder is a valid code. The control module sends an interrogate signal and then receives a response signal from the transponder. If the code in the key is not a valid code, step 58 is executed to activate the anti-theft indicator located in the instrument cluster. Step 59 immobilizes the engine through the powertrain control module. After step 59 the application is restarted at step 52.

Returning to step 56, if a valid code was found in the ignition key, step 60 is executed. Step 60 checks to see if the air bag was recently deployed. If the airbag was deployed step 61 is executed. Step 61 invalidates the code in the transponder of the deployed airbag. Step 61 insures that the transponder of a deployed airbag will not be removed from the deployed airbag and reinserted into an unauthorized airbag.

Step 62 interrogates the transponder in the airbag to determine if it is a valid code. If a valid code is not returned to the control module, step 64 determines whether there was a transponder present. If no transponder was present, step 66 is executed. Step 66 activates the airbag and anti-theft indicators. Then, step 68 is executed which degrades the engine performance. Steps 66 and 68 allow the vehicle operator to drive the car with degraded performance after the airbag has been deployed. This encourages the vehicle operator to service the vehicle and replace the airbags. Step 66 and 68 are also executed when a replacement airbag without a transponder has been used. This indicate an unauthorized airbag replacement and thus, the engine performance and airbag indicator lights would signal the driver to seek servicing of the vehicle.

Referring back to step 64, if an airbag transponder was present then step 70 is executed. Step 70 activates the airbag and indicator lights. Step 72 may either immobilize the engine or degrade the engine performance depending on the design choice. Steps 70 and 72 are executed when the airbag transponder security code has not been programmed into the non-volatile memory. This would indicated that the airbag was replaced by a stolen or unauthorized airbag. Typically in the case of an authorized airbag, the transponder code of the airbag is programmed into the PATS controller memory. For added security the airbag security code may be a rolling code that once deployed, changes during operation. The next code in the sequence code cannot be determined so it can not be programmed into the controller memory. If a stolen airbag's code were known, the sequencing of the rolling code would not be known. Thus, the airbag code of an unauthorized airbag would not be capable of being programmed into the PATS controller memory.

Referring back to step 62, if an airbag transponder with a valid code was found, the airbag indicator lights, if deployed, are deactivated in step 74. Also in step 74 the anti-theft indicators are deactivated.

Each of steps 68, 72 and 74 finish with step 76, which monitors whether the ignition key has been turned off. If the ignition key has been turned off, then the system restarts the activation waiting for the key to be turned back on in step 52. If the ignition key has not been turned off, then the system waits until the system has been turned off.

To be sure that a transponder has been read, system may, for example in steps 62, 64 and 56, require the use of several reads of the transponder.

As would be evident to one skilled in the art, several modifications of the invention may be made while still being within the scope of the appended claims. For example, if the removable accessory is a radio, the radio itself may be disabled rather than the engine control module. Also, audible warnings can also be provided such as providing warning buzzer if the removable accessory is an unauthorized removable accessory.

What is claimed:

1. An anti-theft system for a removable accessory of an automobile comprising:

a transponder located in said removable accessory, said transponder having a transponder security code;

a remote sensing coil operatively coupled to said transponder, wherein said remote sensing coil is adjacent said transponder when said removable accessory is in an unremoved position;

a memory storing a stored security code corresponding to said transponder;

a control module coupled to said remote sensing coil and said memory, said control module generating an interrogate signal and receiving a response signal through said remote sensing coil, said transponder generating said response signal in the form of a transponder security code in response to said interrogate signal, said control module comparing said transponder security code to said stored security code, and then if said transponder security code is not equal to said stored security code, disabling a predetermined function; and output means coupled to said control module for providing an indication to a vehicle operator of said disabled predetermined function.

2. An anti-theft system as recited in claim 1 further comprising triggering means connected to said control module for triggering said control module to generate said interrogate signal.

3. An anti-theft system as recited in claim 2 wherein said triggering means comprises an ignition sensor.

4. An anti-theft system as recited in claim 3 wherein said triggering means triggers said control module when an ignition switch is placed in an on position.

5. An anti-theft system as recited in claim 1 wherein said output means comprises an on-board diagnostics interface.

6. An anti-theft system as recited in claim 1 further comprising a timing means for measuring time, said control means storing an installation time and serial number of said removable accessory in said memory.

7. An anti-theft system as recited in claim 1 wherein said output means comprises a powertrain control module and an internal combustion engine, said disabled function comprises degrading the performance of said internal combustion engine by altering a control strategy within said powertrain control module.

8. An anti-theft system as recited in claim 1 wherein said removable accessory comprises a radio.

9. An anti-theft system as recited in claim 1 wherein said removable accessory comprises an airbag.

10. An anti-theft system as recited in claim 1 wherein said airbag transmits a deployed signal to said control module when said airbag is deployed, said control module invalidating said transponder security code.

11. An anti-theft system as recited in claim 1 further comprising an illuminated indicator, said illuminated indicator illuminating if a function has been disabled.

12. An anti-theft system for a plurality of removable accessories of an automobile comprising:

a plurality of transponders, each of said transponders associated with one of said removable accessories, each transponder having a respective transponder security code;

a remote sensing coil means operatively coupled to said transponders, wherein said remote sensing coil means comprises a single remote sensing coil, each of said transponders having a respective address and said control module emitting an interrogation signal having an address to interrogate each respective transponder;

a memory storing a stored security code for each of said transponders;

a control module coupled to said remote sensing coil means and said memory, said control module generating an interrogate signal and receiving a response signal through said remote sensing coil, said transponder generating a response signal in the form of a transponder security code in response to said interrogate signal, said control module comparing said transponder security code to said stored security code, and then if said transponder security code is not equal to said stored security code, disabling a predetermined function; and output means coupled to said control module for providing an indication to a vehicle operator of said disabled predetermined function.

13. An anti-theft system as recited in claim 12 wherein said disabled function comprises degrading said performance of said engine.

14. An anti-theft system as recited in claim 12 further comprising a multiplexer coupled to said control module, said control module communicating through said multiplexer to said remote sensing coil means.

15. An anti-theft system for an airbag of an automobile comprising:

a transponder located in said airbag, said transponder having a airbag transponder security code;

a remote sensing coil operatively coupled to said transponder;

a memory storing a stored security code associated with said transponder;

a control module coupled to said remote sensing coil and said memory, said control module generating an interrogate signal and receiving a response signal through said remote sensing coil, said transponder generating a response signal in the form of a transponder security code in response to said interrogate signal, said control module comparing said transponder security code to said stored security code, if said transponder security code is not equal to said stored security code, disabling a predetermined function;

triggering means coupled to said control module for triggering said control module to generate said interrogate signal; and output means coupled to said control module for providing an indication to a vehicle operator of said disabled predetermined functions;

wherein said airbag transmits a deployed signal to said control module when said airbag is deployed, and wherein said control module invalidates said transponder security code in response to said deployed signal.

16. An airbag anti-theft system as recited in claim 15 wherein said triggering means comprises an anti-theft system monitoring the presence of said airbag.

17. An anti-theft system as recited in claim 15 further comprising a timing means for measuring time, said control means storing an installation time and serial number of said removable accessory in said memory.

* * * * *